United States Patent [19]
Kuhlemann

[11] Patent Number: 5,864,068
[45] Date of Patent: Jan. 26, 1999

[54] TURBINE FLOWMETER INCLUDING AN ADJUSTING DEVICE FOR COMPENSATING FOR MANUFACTURING TOLERANCES

[75] Inventor: Holger Kuhlemann, Sarstedt, Germany

[73] Assignee: H. Meinecke AG, Laatzen, Germany

[21] Appl. No.: 786,436

[22] Filed: Jan. 21, 1997

[51] Int. Cl.[6] ..................................................... G01F 1/05
[52] U.S. Cl. ........................................................ 73/861.79
[58] Field of Search ................................ 73/861.79, 275, 73/277, 281

[56] References Cited

U.S. PATENT DOCUMENTS

| | | | |
|---|---|---|---|
| 2,949,764 | 8/1960 | Knauth | 73/861.79 |
| 4,408,498 | 10/1983 | Heath | 73/861.79 |

*Primary Examiner*—Richard Chilcot
*Assistant Examiner*—Harshad Patel
*Attorney, Agent, or Firm*—Michael J. Striker

[57] ABSTRACT

The turbine flowmeter includes an impeller wheel mounted, so that it can rotate, between an upstream hub and downstream hub in a tubular element. The hubs are mounted securely in the tubular element by ribs. A device for regulating to compensate measuring errors resulting from manufacturing tolerances is provided at least on the upstream hub. To provide the regulating effect as well as to avoid an asymmetric flow against the impeller wheel the regulating device includes a pivotable regulating part (6) including fins (9) and is located immediately downstream of the upstream hub (1) and a drive device for pivoting the rotatable regulating part (6) about the impeller-wheel axis (A) between an off position (O) in which fins (9) are located in a turbulence region immediately downstream of the ribs (4) in a flow direction (F) through the tubular element (5) and at least one pivoted position (P',P'') in which fins (9) extend in a flow region between the ribs (4) and are uniformly circumferentially distributed around the regulating part (6) to deflect a flow past it.

6 Claims, 5 Drawing Sheets

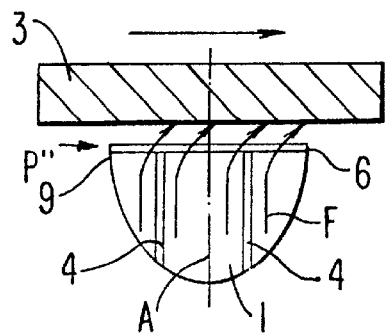
FIG.1.1
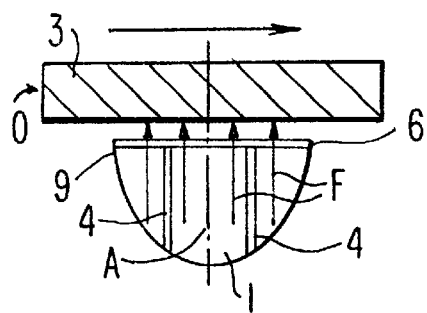
FIG.1.2
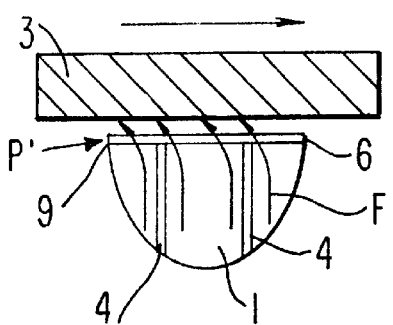
FIG.1.3
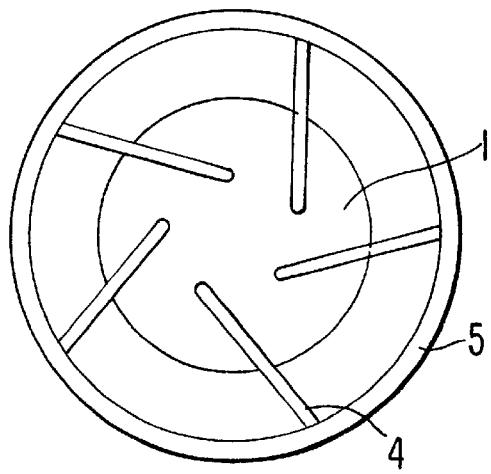
FIG.3
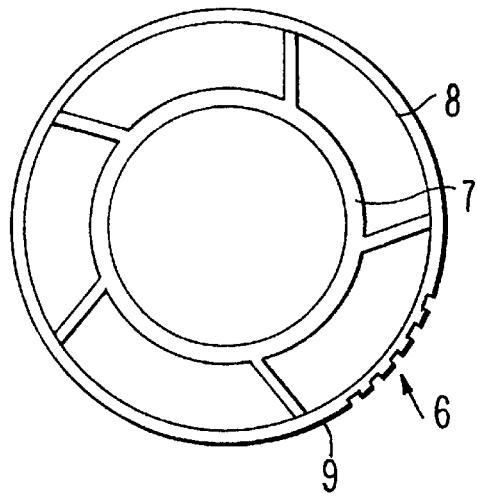
FIG.4

TURBINE FLOWMETER INCLUDING AN ADJUSTING DEVICE FOR COMPENSATING FOR MANUFACTURING TOLERANCES

BACKGROUND OF THE INVENTION

The present invention relates to turbine flowmeters.

A turbine flowmeter is described here having an impeller wheel mounted, so that it can rotate, between an upstream hub situated on an upstream side and a downstream hub situated on a downstream side in a tubular element. The hubs are, in each case, mounted in the tubular element in a fixed relationship to the tubular element by ribs. Means for regulating to compensate measuring errors resulting from manufacturing tolerances are provided at least on the upstream hub.

Due to manufacturing tolerances, standard turbine flowmeters exhibit slight measuring errors which must be regulated, i.e. minimized by suitable measures.

According to the state of the art it is known to form one of the ribs securing the hub situated upstream of the impeller wheel as a regulating vane, whereby for this purpose the rib is mounted so that it can rotate about a radial axis. In its off position this regulating vane is oriented in the flow direction of the fluid to be measured. If the regulating vane is rotated into the flow, the flow experiences a change of direction. The flow influenced in this way is also received by the impeller wheel, i.e. its speed of rotation increases or decreases depending on the direction in which the regulating vane is swung out. Indicator deviations brought about as a result of the manufacturing process can be compensated with the help of this control device comprising the regulating vane.

In the case of a reverse flow, the regulating vane described is in a position downstream of the impeller wheel and, consequently, does not have any effect on the rotational speed of the impeller wheel. To be able to regulate when the flow is in the reverse direction as well, a second, additional regulating vane is incorporated in a similar way on the other side of the impeller wheel. Therefore, measuring errors of the turbine flowmeter can be compensated in both flow directions with this type of control device.

With this known arrangement, when the regulating vane is swung out, besides the desired change of flow direction, an undesired asymmetry in the flow against the impeller wheel is produced. This results in additional forces in a certain direction transverse to the flow on the impeller wheel and on its bearings which are then subject to more rapid, one-sided wear in this direction. Apart from that, the amount by which the turbine flowmeter can be regulated with this arrangement depends on the flow velocity of the fluid. In particular, the regulating effect steadily deteriorates as the flow rate decreases until the effect disappears completely.

SUMMARY OF THE INVENTION

The object of the present invention is to provide a turbine flowmeter which avoids the aforementioned disadvantages in the regulation of the measuring errors which are attributable to the manufacturing process.

According to the invention, the turbine flowmeter of the above-described type is provided with a pivotable regulating part and means for pivoting it about the impeller-wheel axis. This regulating part is located directly downstream of the upstream hub and upstream of the impeller wheel.

The regulating part has fins which in the off position of the regulating part are in a turbulent region directly behind the ribs securing the hub in a flow direction and which in a pivoted position of the regulating part from this off position extend in a flow region between the ribs and are evenly distributed around the periphery of the regulating part to deflect the flow.

In the off position the regulating part has no effect on the rotational speed of the impeller wheel; its fins, in a manner of speaking, form an elongation of the hub ribs extending in an axial direction through the tubular element and the flow remains undisturbed. To regulate a measuring error, the regulating part is now pivoted about the impeller-wheel axis so that its fins move in a circumferential direction from the cover of the hub ribs and project into the flow in the flow region. Hence, the direction of flow against the vanes of the impeller wheel is then influenced. The rotational speed of the impeller wheel is increased or decreased depending on whether the regulating part is pivoted to one side or the other respectively from the off position. In the pivoted position of the regulating part, the ribs and the fins associated with them continue to form one unit from a fluid mechanical viewpoint. The interaction of ribs and fins can be likened to an aircraft wing and the elevators incorporated in it.

Transverse forces act on the impeller wheel at the points where the flow is influenced but such forces cancel each other out due to the uniform distribution of fins around the circumference of the flow region so that no resulting transverse forces build up which can damage the bearings. In the simplest case, for example, it is sufficient to provide two diametrically opposed hub ribs and fins of the regulating part associated with them. However, it is obvious that a greater number of ribs and fins interacting with them can of course achieve larger regulating effects. Here it is not absolutely essential for the number of ribs to match the number of fins. Providing fewer fins than ribs is also possible, the only criteria being that the fins which are present should be distributed evenly around the periphery and lie in the turbulent region behind the associated ribs when the regulating part is in the off position. It is not absolutely necessary here for the fins to coincide exactly with the ribs. The fins can also be, for example, shorter or narrower than the ribs.

A further advantage of the above regulating device according to the invention is that a consistent regulating effect can be provided over the entire flow-rate measuring range; i.e. the disadvantages of the state of the art in the case of low flow rates are avoided. Moreover, regulating effects can be achieved which are many times greater than those of the known regulating arrangements; i.e. larger measuring errors can be compensated.

For regulating in the case of a reverse flow, a regulating part of identical structure and identical function to that on the upstream hub can be provided on the downstream hub.

In a preferred embodiment of the invention, each regulating part is designed like a ring and comprises a center ring, the fins and an outer rim. The regulating part is adjusted, as is known from the aforementioned prior art regulating vanes, by a drive means for pivoting it which transmits the externally applied adjusting movement into the pressurized measuring portion in the tubular element. The drive means passes through the meter housing or the top flange of the housing and is sealed with a seal element from the pressurized measuring region or portion.

The drive means comprises in a preferred embodiment a toothed rack on an external section of the outer rim which engages with a worm gear provided in the drive means. To make this interaction of toothed rack and worm gear possible, the wall of the tubular element is penetrated at this point but sealed with the seal element.

In a further embodiment of the invention, the drive means comprises two sliding telescopic sections, so that a twisting movement from one of the sections can be transmitted to the other without hindering the telescopic-type longitudinal movement of the sections. A spring is fitted between the two sections which forces the sections apart in the longitudinal direction so that the upper section can be pressed against the seal.

A drive means formed in this way transmits the adjusting movement to the regulating part by rotation while, due to its longitudinal mobility acted upon by the force of the spring, it is forced against the seal at the point where it passes through into the measuring area. The drive means can be pressed forcing the telescoping sections together against the internal pressure and the external spring force by pressing on it so that the upper section lifts from the seal, thereby allowing air to escape from the meter.

Because of this arrangement, besides its adjusting function the drive means at the same time also advantageously serves for deaerating the meter. The deaeration can be carried out with simple means without tools by, for example, pressing the drive means downwards with, the aid of a ballpoint pen or screw driver. It is of course also possible to construct the drive means for adjusting or rotating the regulating part in a different manner. For example, a nut, fixed so that it cannot turn, can be positioned on the outer rim to engage with a screw which passes through a sealed aperture in the meter housing. The regulating ring is then adjusted by screwing the screw into or out of the nut. The play in the thread between screw and nut is sufficient to achieve the slight horizontal sweep of the fins of the regulating part from the turbulent region behind the hub ribs and thus influence the flow in the desired manner. This drive means for adjusting the regulating part is very simple from a manufacturing viewpoint, but in this embodiment of the drive means the deaerating function of the drive is not included.

According to the state of the art, the drive for the means for regulating is usually mounted on top of the meter in a position where, because of the compact form of the meter's structure, the space available is mainly taken up by the meter mechanism. For this reason, the regulator drive is arranged below the meter mechanism and is then only accessible after the meter mechanism has been removed.

The advantage of this embodiment is that the drive means for the regulator is made tamper-proof without the need for a special lead seal—just the lead seal of the meter mechanism. The disadvantage is that access is only possible after dismantling or removing the meter mechanism.

In an additional embodiment of the present invention, therefore, means are provided which, for actuating the regulator drive, which can be swung out laterally from the meter mechanism. This can be accomplished, for example, by a lever which has an articulated joint where it is attached to the regulator drive, which is folded away into a free space within the meter mechanism when not in use and which can be folded out from the meter mechanism for operation. Gear wheel pairs which may be swung out are also possible here. The advantage of such an arrangement is that the meter mechanism does not have to be removed, as was hitherto the case, to be able to operate the regulator drive. With this type of structure, an additional lead seal for the regulator drive is not necessary; the lead seal of the meter mechanism can be used.

BRIEF DESCRIPTION OF THE DRAWING

The objects, features and advantages of the present invention will now be illustrated in more detail by the following detailed description, reference being made to the accompanying drawing in which:

FIG. 1.1 is a schematic side view showing the plus position of the regulating part in a turbine flowmeter according to the invention by which the rotational speed of the impeller wheel is increased, FIG. 1.2 is a schematic side view showing the off position of the regulating part in the turbine flowmeter of FIG. 1.1 by which the rotational speed of the impeller wheel remains unaffected, FIG. 1.3 is a schematic side view showing the minus position of the regulating part in the turbine flowmeter of FIG. 1.1 by which the rotational speed of the impeller wheel is decreased;

FIG. 3 is a plan view of the upstream hub and its mounting elements in the tubular element in the flow direction, the other parts of the meter not being illustrated, FIG. 4 is a plan view of a regulating part in a turbine flowmeter according to the invention which is used with the upstream hub according to FIG. 3, in which other parts of the meter are not illustrated.

DESCRIPTION OF THE PREFERRED EMBODIMENTS

Figure 2:
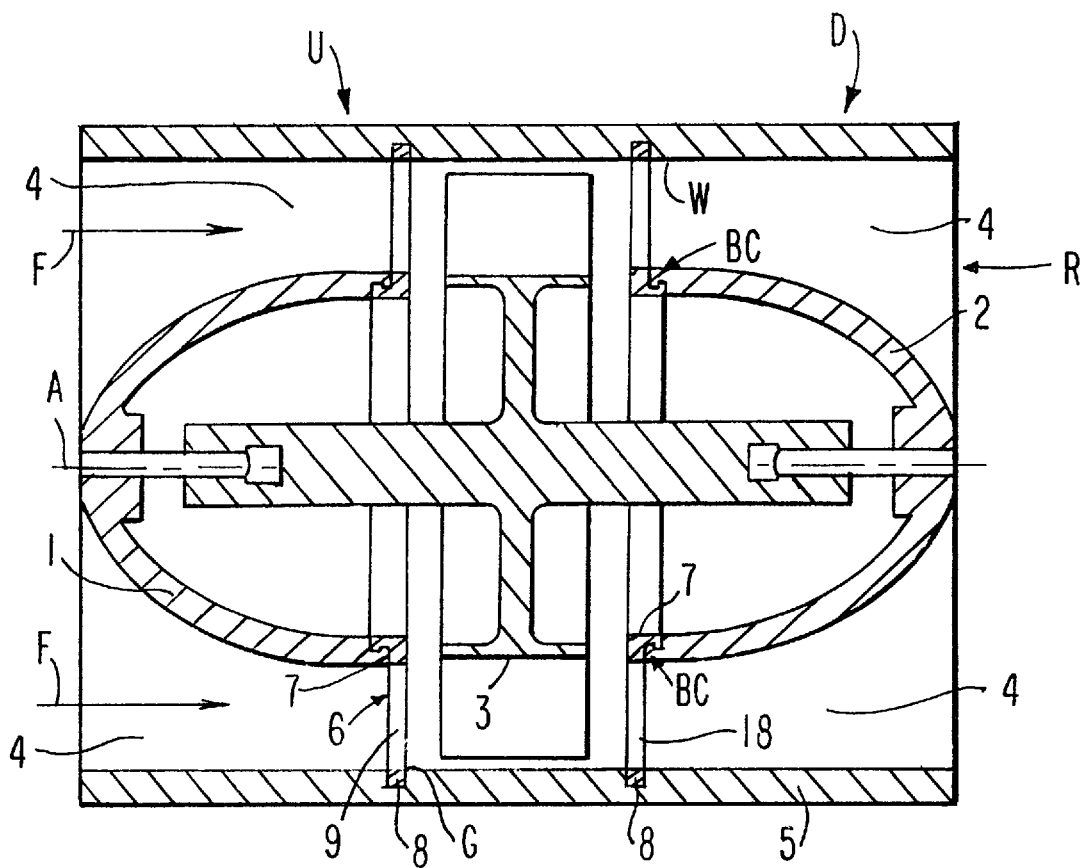
FIG. 2 is a longitudinal cross-sectional view through a turbine flowmeter according to the invention having both a regulating part on the upstream hub and a regulating part or ring on the downstream hub.

A preferred embodiment of the turbine flowmeter according to the invention is shown in FIG. 2. Except for the structure of the invention it is constructed as in the conventional manner. An impeller wheel 3 is mounted between an upstream hub 1 located on an upstream side U of the tubular element 5 (i.e. upstream of the impeller wheel in flow direction F) and a downstream hub 2 situated on a downstream side D of the tubular element 5 (i.e. downstream of the impeller wheel in the flow direction F). The impeller wheel 3 is mounted so that it can rotate and move in an axial direction. The hubs 1, 2 are each mounted securely by ribs 4 in the tubular element 5 which bounds the region through which the flow occurs in a fixed relationship with the tubular element. In this embodiment the hubs are formed in one piece with the aforementioned parts.

Figure 6:
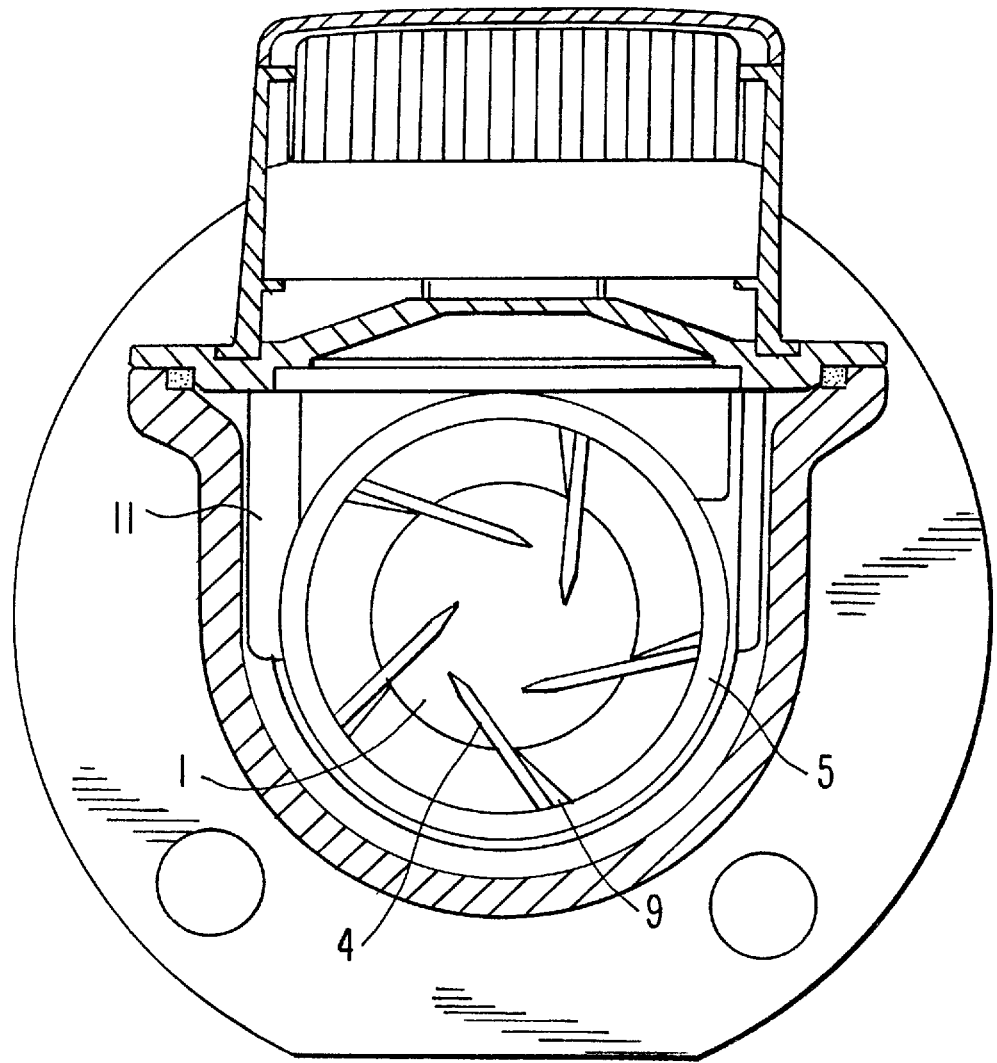
FIG. 6 is a schematic plan view of a measuring device integrated in a meter housing and having a regulating system according to the invention in the flow direction.
Figure 7:
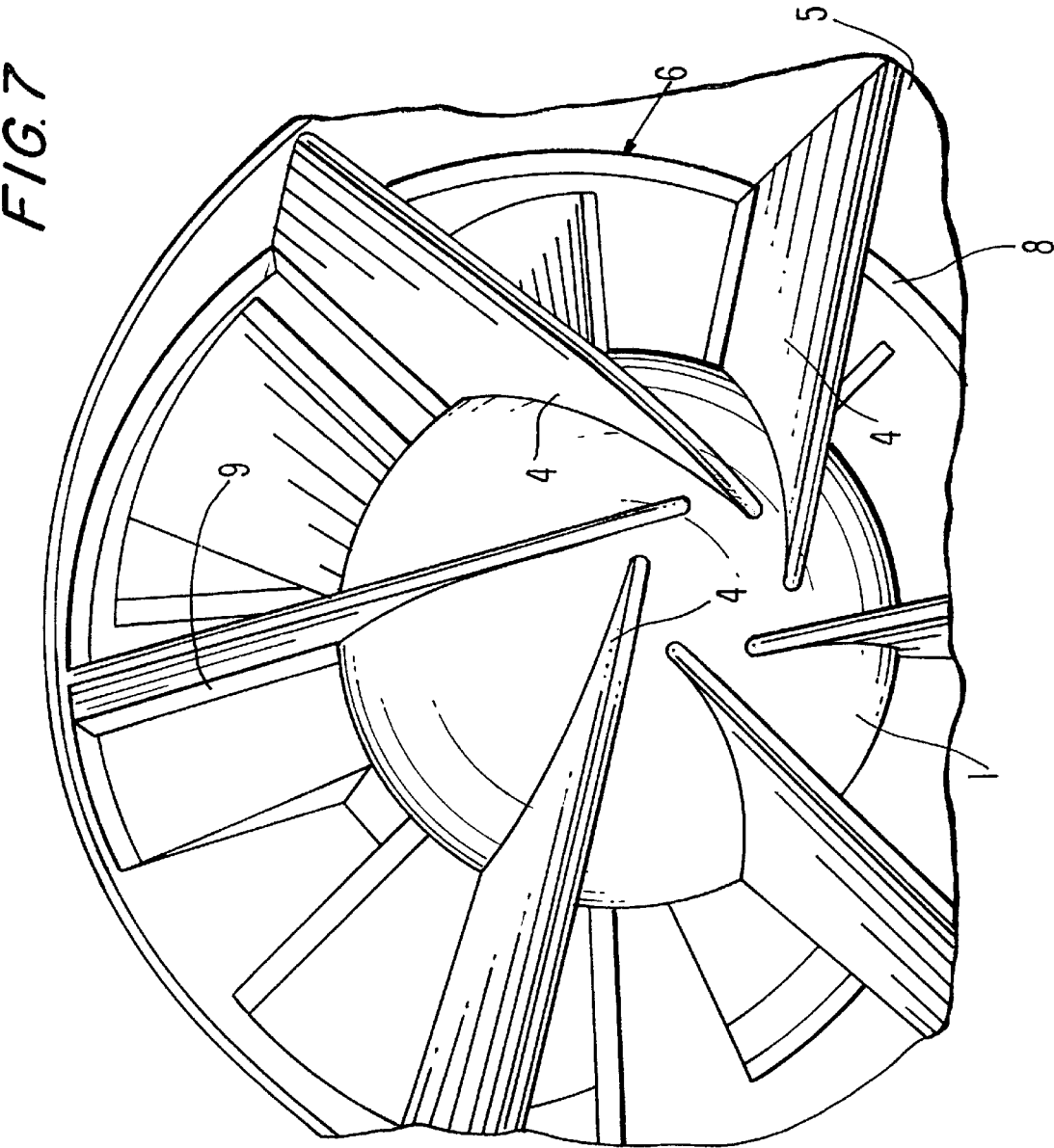
FIG. 7 is a perspective view similar to FIG. 1.3 showing the minus position of the regulating part in the turbine flowmeter by which the rotational speed of the impeller wheel is decreased.

The positions of the ribs 4 in the preferred embodiment are best seen in FIGS. 3 and 6. The ribs 4 are arranged uniformly distributed around the circumference of a flow region and each one meets the surface of the upstream hub 1 at the same oblique angle. This oblique orientation of the ribs 4 relative to the curved surface of the hub 1 brings about a twisting of the incoming fluid flow. The ribs 4 of the downstream hub 2 situated downstream are formed similarly and oriented similarly to those of the upstream hub 1.

A regulating part 6 is located immediately downstream of the upstream hub 1 but is upstream of the impeller wheel 3. This regulating part is rotatable relative to the upstream hub 1 and is part of means for regulating to compensate measuring errors resulting from manufacturing tolerances. This regulating part 6 comprises a center ring 7 and an outer rim 8 with fins 9 extending between the center ring 7 and the outer ring 8. The center ring 7 is connected to the hub 1 by a bayonet coupling Bc so that the regulating part 6 can rotate relative to the hub 1. This coupling insures that the regulating part 6 is held on the upstream hub 1 and, at the same tine, insures that the regulating part 6 can be pivoted about the impeller-wheel axis A to the small extent necessary for influencing the flow. The outer rim 8 of the regulating ring 6 is engaged but movable in a groove G provided in the interior wall W of the tubular element 5.

By comparing FIGS. 3 and 4 it can be seen that the fins 9 of the regulating part 6 are matched or shaped and oriented to fit the position and shape of the ribs 4 so that in the off position O (rotational position) of the regulating ring 6, the fins 9 are exactly behind the ribs 4 in the flow direction F. This off position O is illustrated in FIG. 1.2. In this case the flow through the flow region near the hubs and impeller wheel remains unaffected, symbolized by the straight arrows in the direction of flow F. The arrow above the impeller wheel 3 indicates—similarly in FIGS. 1.1 and 1.3—the direction of rotation of the impeller wheel 3.

If for the compensation of a measuring error it is necessary to increase the rotational speed of the impeller wheel 3, the regulating part 6—as seen in the direction of the flow F—is pivoted to the right about the impeller-wheel axis A so that the fins 9 are pivoted circumferentially from the turbulent region behind the ribs 4 in the flow direction, as illustrated in FIG. 1.1 in which the regulating part 6 takes the position P". Thus, the flow experiences a deflection to the right, i.e. in the rotation direction of the impeller wheel 3 whose rotational speed is thereby increased. If the rotational speed of the impeller wheel 3 needs to be decreased, the regulating part 6 must be pivoted to the left. This position P' shown in FIG. 1.3 as well as in FIG. 6. The flow is then deflected in a direction opposite to that of the direction of rotation of the impeller wheel 3 whose rotational speed is decreased as a result.

The advantage of this solution is that with a single adjusting movement the entire flow region in the tubular element can be intercepted in a consistent manner and, therefore, no transverse forces acting on the impeller-wheel bearings result when regulating a measuring error.

Figure 5:
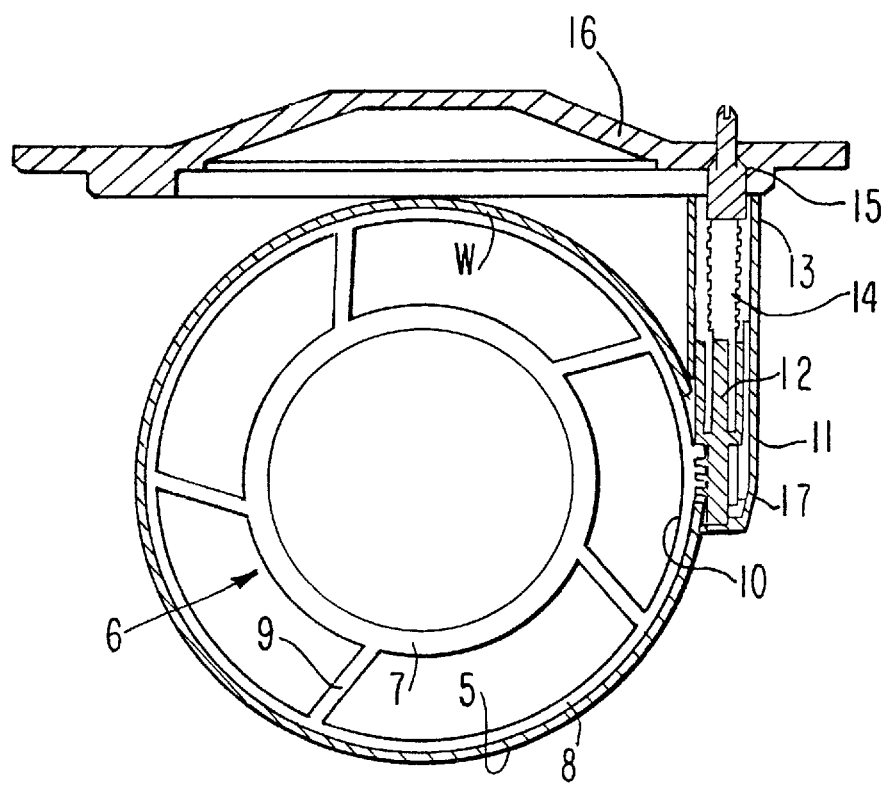
FIG. 5 is a detailed schematic cross-sectional view of a turbine flowmeter according to the invention showing the structure of the regulating part drive device.

FIG. 5 illustrates the drive means for transmitting an externally applied adjusting movement to the regulating part 6. It can be seen that an outer section of the outer rim 8 of the regulating part 6 is formed as a toothed rack 10. In the vicinity of this outer section 10 formed like a toothed rack, the interior wall W of the tubular element 5 is provided with an opening into which a guide 11 is fitted. The drive means for the regulating part 6 comprises two approximately coaxial sections 12, 13 accommodated in this guide 11. The two nearly coaxial sections 12, 13 are joined and interlocked together in a telescoping manner so that they can be moved axially or longitudinally relative to each other but can transmit a rotational movement from one section to the other section. Placed between the sections 12, 13 is a coil spring 14 which forces the section 13 against a seal 15 in the opening provided in the top flange 16. The end of the upper section 13 passing through the top flange has a slot for a screwdriver.

On the bottom end of the section 12 there is a worm gear 17 which engages with the toothed rack 10 of the outer rim 8 of the regulating part 6. By turning the upper section 13 with a screwdriver, the rotation is transmitted to the lower section 12 and hence to the regulating part 6. At the same time, this drive means is structured to deaerate the flowmeter. To do this, the upper section 13 of the drive means is pressed downwards thereby causing it to lift off the seal 15 and create a connection between the pressurized area and the atmosphere.

For the case of a reverse flow, an additional regulating part 18 is provided on the other side of the impeller wheel 3, as can be seen in FIG. 2. The structure and operation of this regulating part 18 are identical to the structure and operation of the regulating part 6 situated upstream so that further explanations are rendered unnecessary here.

While the invention has been illustrated and described as embodied in a turbine flow meter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A turbine flowmeter comprising an impeller wheel (3) rotatably mounted for rotation about an impeller-wheel axis (A) in a tubular element (5) having an upstream side (U) and a downstream side (D) relative to the impeller wheel (3); an upstream hub (1) in the tubular element (5) on the upstream side (U) relative to the impeller wheel (3), a downstream hub (2) in the tubular element on the downstream side (D) relative to the impeller wheel (3), ribs (4) attaching the upstream hub and the downstream hub to the tubular element (5) in a fixed relationship to the tubular element (5) and means for regulating to compensate measuring errors resulting from manufacturing tolerances of the impeller wheel, the hubs and the tubular element, wherein said means for regulating comprises a rotatable regulating part (6) including fins (9), said rotatable regulating part being mounted on the upstream hub (1) so as to be immediately downstream of the upstream hub (1) and upstream of the impeller wheel (3), and means for pivoting the rotatable regulating part (6) about the impeller-wheel axis (A) between an off position (O) in which said fins (9) are located in a turbulence region behind the ribs (4) in a flow direction (F) through said tubular element (5) and at least one pivoted position (P',P") in which said fins (9) extend in a flow region in the tubular element between the ribs (4) and said fins are uniformly distributed around a circumference of said regulating part (6).

2. The turbine flowmeter as defined in claim 1, further comprising an additional rotatable regulating part (18) mounted rotatably on said downstream hub (2) to regulate a reverse flow (R) through said tubular element (5) and means for pivoting the additional rotatable regulating part (18) about the impeller-wheel axis (A).

3. The turbine flowmeter as defined in claim 2, wherein each of said regulating parts (6, 18) comprises a center ring (7), an outer rim (8) and said fins (9) extend between the outer rim (8) and the center ring (7), the regulating parts (6,18) are movably engaged via said outer rim (8) in respective grooves provided in an interior wall (W) of the tubular element (5) and said means for pivoting said regulating part (6) about the impeller-wheel axis (A) includes means for rotatably mounting the regulating part (6) via the center ring (7) thereof on the upstream hub (1).

4. The turbine flowmeter as defined in claim 3, wherein said means for regulating includes drive means for transmitting an externally applied adjusting movement to the regulating part (6) on the upstream hub (1) through said tubular element (5) and a seal (15) between said tubular element (5) and said drive means, wherein said drive means includes a toothed rack (10) provided on an outer section of the outer rim (8) of the regulating part (6) on the upstream hub (1) and a worm gear (17), said toothed rack (10) being engaged with the worm gear (17) so that, when the worm gear (17) is rotatably driven by the externally applied adjusting movement, said regulating part (6) is pivoted.

5. The turbine flowmeter as defined in claim 4, wherein the drive means for transmitting an externally applied adjusting movement includes two sections (12, 13), a spring (14) arranged between said sections (12,13) and means for connecting each of said sections (12,13) together in a telescoping manner so that said sections can move axially relative to each other but cannot rotate relative to each other, and wherein one (12) of said sections includes the worm gear (17) engaged with the toothed rack (10) of the regulating part (6) pivotable on the upstream hub (1), and the other (13) of said sections extends through said seal (15), and the spring (14) is fitted between the two sections (12, 13) so that the other section (13) is urged toward the seal (15).

6. The turbine flowmeter as defined in claim 4, further comprising means for folding said drive means to and from a meter mechanism including said downstream and upstream hubs and said impeller wheel to save space when said drive means is not being used.

* * * * *